United States Patent [19]
Kownacki

[11] Patent Number: 5,238,107
[45] Date of Patent: Aug. 24, 1993

[54] DISC STORAGE CONTAINER HAVING A SECURING MEANS CENTRAL APERTURE

[76] Inventor: Charles D. Kownacki, 3827 McClelland Ave., Erie, Pa. 16510

[21] Appl. No.: 817,736

[22] Filed: Jan. 7, 1992

[51] Int. Cl.$^5$ .............................. B65D 85/57
[52] U.S. Cl. .............................. 206/310; 206/312; 206/444; 206/493
[58] Field of Search .............. 206/309, 310, 312, 313, 206/444, 303, 493; 360/133

[56] References Cited

U.S. PATENT DOCUMENTS

| | | | |
|---|---|---|---|
| 2,785,797 | 3/1957 | Rice | 206/310 |
| 3,107,783 | 10/1963 | Corey et al. | 206/312 |
| 3,949,872 | 4/1976 | Paudras | 206/310 |
| 4,535,888 | 8/1985 | Nusselder | 206/449 |
| 4,746,013 | 5/1988 | Suzuki et al. | 206/309 |
| 4,793,479 | 12/1988 | Otsuka et al. | 206/310 |
| 4,874,085 | 10/1989 | Grobecker et al. | 206/309 |
| 4,903,829 | 2/1990 | Clemens | 206/310 |

FOREIGN PATENT DOCUMENTS

| | | | |
|---|---|---|---|
| 2271632 | 12/1975 | France | 206/312 |
| 0205589 | 8/1990 | Japan | 206/310 |

Primary Examiner—Bryon P. Gehman

[57] ABSTRACT

An impact-resistant storage container for information recording discs. The present invention is particularly suited for storing laser discs. A pedestal supports the discs in a central information-free region and peripheral supports engage an outer edge to prevent warping. A plurality of resilient fingers engage the inner periphery of the disc and secure it to the pedestal. A push button mechanism allows the securing fingers to be cammed inwardly by the inner periphery of the disc aperture to remove the disc from the pedestal. A second embodiment provides a second platform which hinges to the container to provide storage capacity for a second disc for extended length movies.

15 Claims, 4 Drawing Sheets

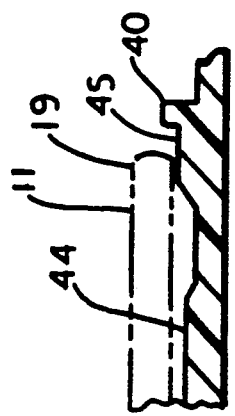
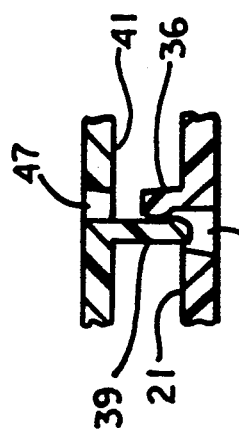
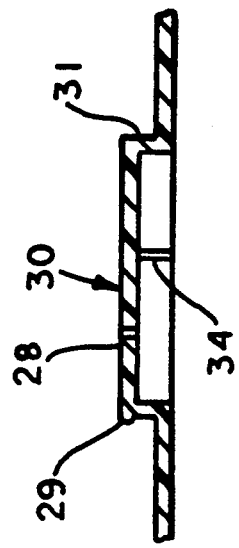
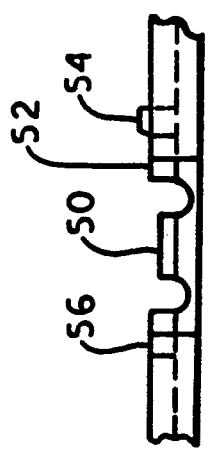
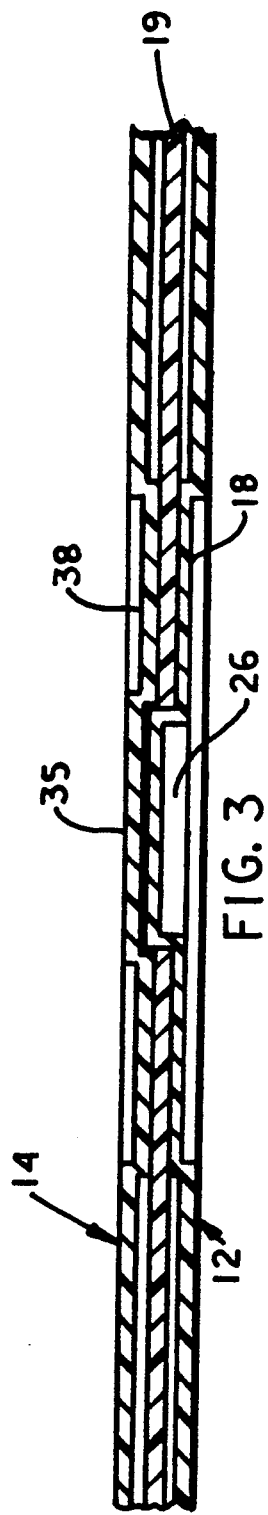

DISC STORAGE CONTAINER HAVING A SECURING MEANS CENTRAL APERTURE

BACKGROUND AND SUMMARY OF THE INVENTION

The present invention is directed to a storage container for an information-recording disc such as a laser disc, or the like. Certain aspects of this invention are more generally applicable to containers for storing compact discs, as well.

Currently, laser discs are conventionally stored in l.p.-type jackets, the disc being slipped into a cardboard sleeve. Such a sleeve offers very little in the way of protection to the laser disc and requires the type of handling that almost necessitates getting fingerprints on the face of the recording disc. This type of container is undesirable. The non-contact stylus of the laser disc player virtually ensures unlimited life of undiminished quality so long as the disc itself is not damaged through the wear and tear of handling and storage. Accordingly, a high durability container case that protects the laser disc is desired.

Several attempts have been made to develop a suitable impact-resistant container that will adequately protect the laser disc for storage and transport. One such type of storage container shown in U.S. Pat. Nos. 4,076,119 and 4,084,690 issued to Clarke and Pulse, respectively, requires the laser disc to be reconfigured with a pair of arcuate openings near the center to receive projecting portions of the container. These openings appear to unnecessarily weaken the structure of the disc without any corresponding benefit in handling (i.e., the risk of fingerprinting the disc remains undiminished).

A second style of container taught by U.S. Pat. Nos. 4,771,883 and 4,778,047 issued to Herr et al. and Lay, respectively, seem to be merely modest revisions to the l.p.-type jacket with significant sliding motion between the laser disc and the protective sleeve of the storage container being necessary, a movement which has the greatest potential for damaging the face of the disc.

A more recently developed storage container is described in U.S. Pat. No. 4,874,085 issued to Grobecker et al. The Grobecker et al. patent describes a number of embodiments, each of which has a support platform that engages only the central portion of the disc which is free of information and offers some sort of retention means on the post. While non-engagement of the information tracks is theoretically to be desired, the failure of the container to support any outer peripheral portion of the disc subjects the disc to the possibility of warpage. Further, the central post retainers lack any type of release mechanism, being generally similar to the c.d. style retaining fingers. This type of retention means is difficult enough to cope with in engagement with the smaller compact disc requiring flexing of the disc to effect disengagement and poses an even greater threat to the larger diameter, more flexible laser disc. FIG. 24 of the Grobecker et al. patent discloses an embodiment which may not suffer from this difficult-to-remove problem. Two segmental fingers from a post projecting from the top and two fingers projecting from the bottom both engage in the central apperture of the disc. While it is unlikely that removal would pose a problem with this embodiment, retention may. The laser disc is as likely to be retained by the top post as the bottom (particularly if the case is held vertically and opened in clamshell fashion) and may well simply disengage from both posts upon opening of the case and simply slide from the container onto the floor.

It is among the purposes of the present invention to overcome the deficiencies of the present lase disc storage techniques by providing an impact-resistant storage container with a releasable retention mechanism. This manually operable push button device will permit the retention fingers to be cammed inwardly releasing its hold on the disc. Further, since this release mechanism is readily operable by a person's thumb, the hand of the operator will be naturally positioned to engage the disc on the inner and outer peripheral edges of the disc. This will minimize unnecessary smudging of the disc during handling. The top and bottom halves of the container are interconnected along one edge by a living hinge. Interengaging retention fingers protrude from the top and bottom portions adjacent other edges of the case and serve to latch the two halves of the container in a closed position.

The container of the present invention includes a pedestal that engages only a central portion of the disc but also provides a plurality of peripheral supports for the edge of the disc. These peripheral supports preferably engage only the outermost edge where no information is stored so that the information-containing portion of the disc extends between the pedestal and the peripheral edge support in a substantially unsupported (and, therefore, fully protected) condition. A plurality of radially extending ridges serve to reinforce the lateral side faces of the case against deflection. Yet, should the lateral faces of the case be flexed in such a manner as to contact the disc, the ridges, which resemble pillow-like elements, will cause no marring or other damage to the disc.

A second embodiment with only a slightly larger profile, provides a container to safely store multiple disc (for extended length movies). A second wider double living hinge which interconnects the top and bottom portions of the container also provides a plurality of integral hinge pivots for hinge posts attached to a separate support platform for an additional information-recording disc. The top and bottom portions of this multiple disc embodiment are virtually identical to those of the single disc embodiment. Further, the second insertable platform is essentially identical to the support platform formed by the bottom portion having a pedestal, a retention post which is received in the central opening of the second disc, and a manually operable release means on said retention post. The hinge posts snap readily into place in the hinge pivots of the double hinge for adding the second disc storage capacity to the container.

Various other features, advantages and characteristics of the present invention will become apparent after a reading of the following detailed description thereof.

BRIEF DESCRIPTION OF THE DRAWINGS

FIG. 3 is an enlarged cross-sectional side view of a portion of the container shown in the closed position;

FIG. 4 is a cross-sectional side detail view of the release mechanism as seen along line 4—4 in FIG. 2;

FIG. 5 is a cross-sectional side detail view of the peripheral support and circumferential rib as seen along line 5—5 in FIG. 2;

FIG. 6 is a cross-sectional side detail view of the latch of the storage container of the present invention;

FIG. 7 is a detailed end view of the hinge;

DETAILED DESCRIPTION OF THE PREFERRED EMBODIMENTS

Figure 1:
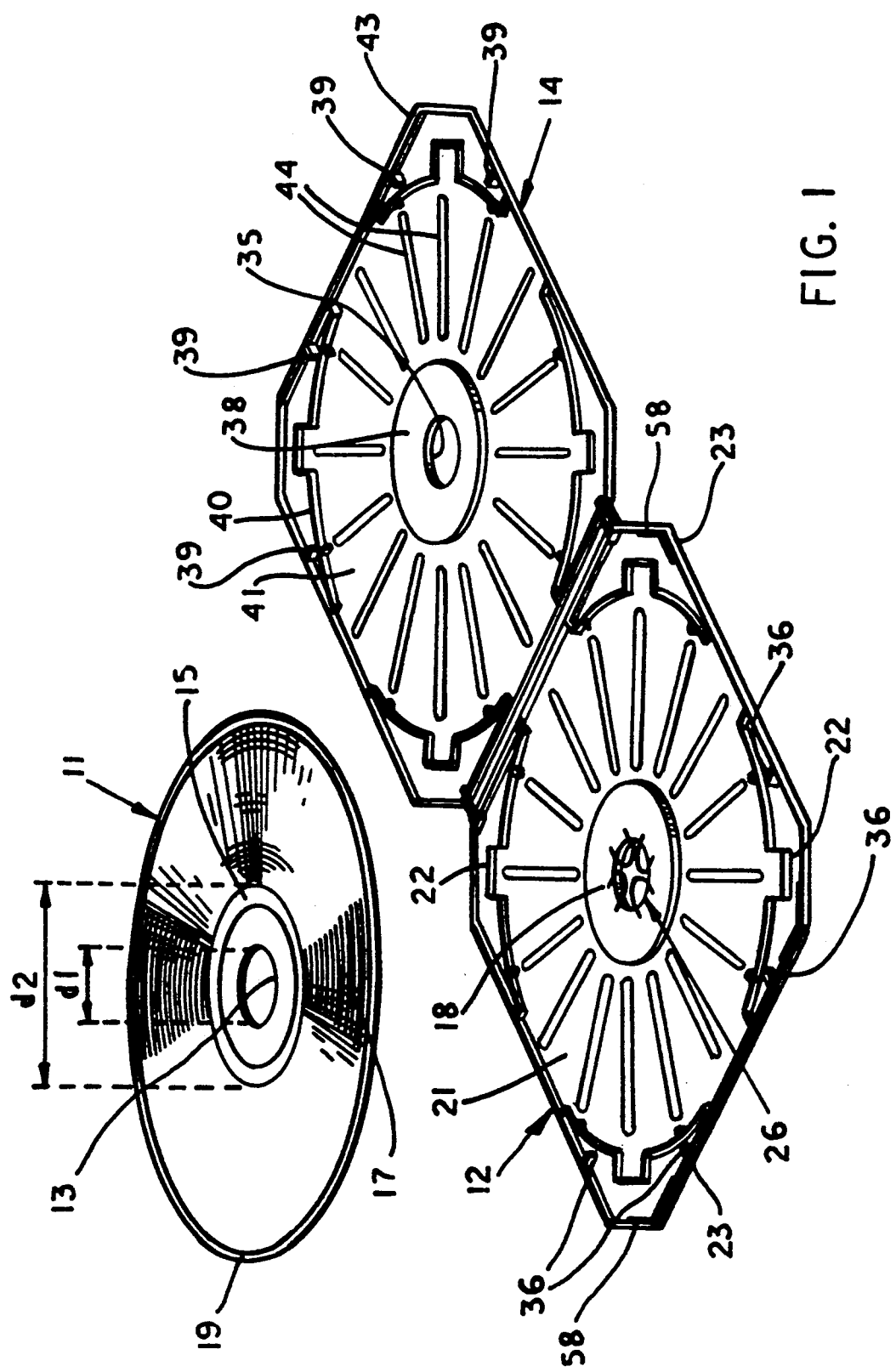
FIG. 1 is an isometric top view of a first embodiment of the information-recording disc storage container of the present invention.

A first embodiment of the information-recording disc storage container of the present invention is shown in FIG. 1 generally at 10. Storage container 10 is specially designed to protect a laser disc 11, although certain features of the present invention could be readily adapted for use with other information-recording discs such as compact discs. Laser disc 11 has a central aperture 13 having a first diameter $d_1$, a first region 15 that is free of stored information which has a second larger diameter $d_2$, a second outer region 17 upon which information is stored and a peripheral edge portion 19 that is also free of information. The disc storage container comprises a bottom portion 12, which is equipped with a platform for supporting and retaining a laser disc, and a top portion 14 which are interconnected by a hinge member 16 which is a double living hinge.

Figure 2:
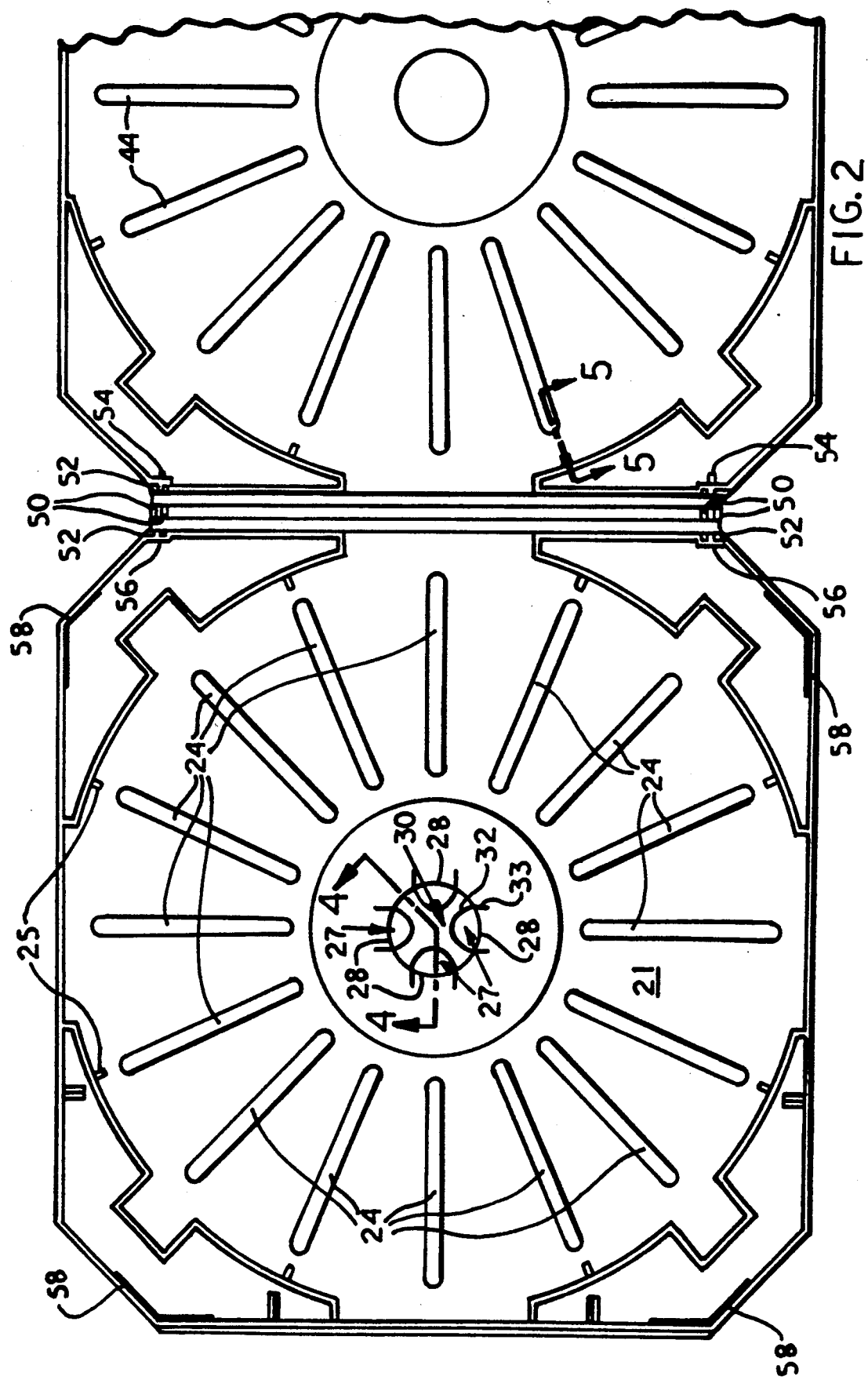
FIG. 2 is an enlarged top view of the bottom portion showing in detail the release mechanism and living hinge of the FIG. 1 container.

As can be seen in FIG. 1 and as is shown in greater detail in FIG. 2, bottom portion 12 has an inner lateral face 21 which is substantially planar, being the inner surface of a generally uniformly thick wall. The storage container 10 is preferably formed of durable polypropylene plastic by injection molding, or the like. A pedestal 18 protrudes upwardly from the level of inner face 21 and provides a surface for engaging and supporting information-recording disc 11. It is preferred that the radial extent of pedestal 18 not exceed the dimension $d_2$ so that the central region of the disc 11 contacted by the pedestal be only the information-free region 15.

An outer peripheral wall 23 extends upwardly from the lateral edge of inner face 21 and a rib 20 which is rectangular in cross section is positioned inwardly of peripheral wall 23 at a point where it will extend generally circumferentially about the periphery of a disc 11 to be stored therein. Circumferential rib 20 defines the region of bottom portion 12 to be occupied by the disc 11 facilitating its insertion into container 10 and provides structural stability to inner face 21. Circumferential rib 20 is relieved at a plurality of locations 22 and fades away into peripheral wall 23 at a second plurality of other locations to permit the outer periphery 19 of disc 11 to be engaged by a thumb during removal procedures. To further reinforce inner face 21, a plurality of reinforcing ribs 24 extend radially outwardly from pedestal 18 like the spokes of a wheel. As can be seen in greater detail in FIG. 5, ribs 24, like their counterparts ribs 44 on upper section 14, extend upwardly from inner face 21 comprising a slight thickening of the wall of bottom 12 in those areas. These ribs 24 may be formed by forming grooves in the tooling (not shown).

A plurality of stabilizing supports 25 (FIG. 2) extend inwardly from circumferential rib 20 a sufficient distance to underlie the peripheral edge portion 19 of disc 11. Stabilizing supports 25 are of a height substantially equal to that of pedestal 18 and, as can be seen in FIG. 5 with reference to their counterpart supports 45 on upper section 14, a height sufficiently greater than the height of ribs 24 so as to avoid contact between ribs 24 and the information-containing portion 17 of disc 11, under normal circumstances. Should the inner face 21 of bottom portion 12 of the container 10 be deflected into contact with the information-containing portion 17 of disc 11, however, the configuration and character of ribs 24 are such that no harm will come to disc 11. The stabilizing supports 25 eliminate the risk of warpage of disc 11 which would otherwise exist should the large diameter laser disc 11 be solely supported centrally by pedestal 18.

A key feature of the present invention is post 26 which includes, not only securing means 27 for retaining the disc region 15 in contact with pedestal 18, but also, a manually operable release means 30 for disengaging securing means 27 for permitting removal of disc 11 from pedestal 18 and post 26. Securing means 27 comprises four resilient fingers 28 which may optionally each have an overhanging lip 29 to engage the upper side of the inner periphery of opening 13 in disc 11. Each finger 28 is preferably formed substantially as a right angle segment which is positioned at the corner of a quadrangle or square.

Manually operable release means 30 is formed as an equilateral cross positioned to interdigitate with the four upstanding resilient fingers 28 of securing means 27. As shown in its normal position (FIG. 4), release means 30 is in an upper position physically and biasing fingers 28 outwardly locking overhanging lips 29 in their securing position above the inner periphery of disc aperture 13. However, when pushbutton release means 30 is pushed downwardly pivoting on elastic hinges 31 formed by extending the cuts 32 that delineate between securing means 27 and release means 30 outwardly as at 33, lateral faces 34 no longer physically engages or biases fingers 28 outwardly permitting the pressure exerted by aperture 13 to pinch them inwardly enabling overlapping lips 29 to disengage the top peripheral surface of aperture 13 so that disc 11 may be removed. Further, the down-and-out pressure of elastic hinges 31 seems to create a similar rotational pressure on the resilient fingers 28, as at the ends fo cuts 33, which pressure assists in the release of disc 11. Note, fingers 28 will adequately retain disc 11 upon pedestal 18 even if overhanging lips 29 are not part of the design.

Two pairs of latching fingers 36 extend upwardly from the inner face 21, a first pair extends axially along face 21 and the second laterally. As best seen in FIG. 6, fingers 36 are formed by pushing material upwardly from face 21 thereby forming openings 37 and extruding that displaced material into the shape desired. Similarly, interengaging fingers 39 are formed in top portion 14 by deforming portions of its inner face 41 upwardly (as seen in FIG. 1) forming openings 47. The four protruding fingers 39 may be extended into openings 37 and the four fingers 36 into openings 47, as may be necessary to engage and disengage the latch means.

Top portion 14 of storage container 10 is formed in a manner similar to bottom portion 12. An upstanding peripheral wall 43 extends about the periphery of face 41 and a circumferential rib 40 extends upwardly from inner face 41 in the same manner as rib 23 on the lower half 12. An opening 35 in pedestal 38 (which does not extend through the outer face of top portion 14) accommodates upwardly extending release mechanism 26 which helps properly align and stabilize the two halves (12 and 14) of container 10. Radially extending ribs 44 provide reinforcement for inner face 41 and supports 45 cooperate with supports 25 on the bottom potion 12 to secure the information-free region 19.

Additional alignment features are provided on hinge 16 where a pair of upwardly extending fingers 50 on each of hinge 16 will capture a half wall 52 on the bottom portion 12 and a half wall 52 on the top portion 14 to provide proper lateral alignment as the disc storage container is being closed to facilitate engagement of latching fingers 36 and 39 on the respective container halves. In addition, upwardly extending member 54 hooks over laterally extending wall 56 to ensure proper positioning of the hinge portions upon closing of the two halves 12 and 14. Further, four angulated stabilizing walls 58 extend upwardly from the inner periphery of outer peripheral wall 23. Stabilizing walls 58 cooperate with member 54, and fingers 50 to ensure proper alignment at closure.

Figure 9:
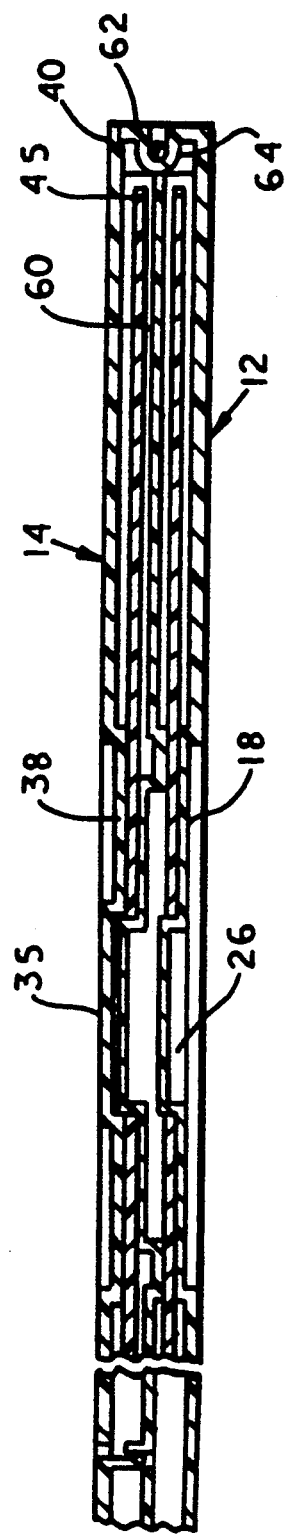
FIG. 9 is a detailed top view of the second embodiment showing the hinge elements for the second disc platform in a disconnected configuration.
Figure 8:
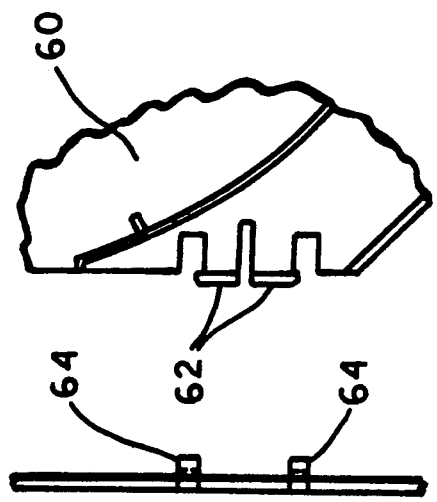
FIG. 8 is a cross sectional side view of a second multiple disc embodiment of the present invention.

A second embodiment is depicted in FIGS. 8 and 9. This embodiment is designed for lengthy movies which require two discs 11. The outer casing is substantially identical to that of the first embodiment having a bottom 12 and a top 14 interconnected by a hinge 16. Hinge 16 is slightly wider than that of the first embodiment to accommodate the second disc 11. Further, hinge 16 is equipped with female loops 64 which receive male hinge posts 62 formed on a second platform member 60. Platform 60 is like the platform situated on the bottom 12 of the first and second embodiments including a pedestal 18, a post 26 and a release mechanism 30. As can be seen in FIG. 8, the two discs are retained in non-contacting positions to safeguard both of the two discs 11.

Various changes, alternatives, and modifications to the specific embodiments discussed above will become apparent to one of ordinary skill in the art following a reading of the foregoing specification. It is intended that all such changes, alternatives, and modifications as come within the scope of the appended claims be considered part of the present invention.

I claim:

1. A container for storing at least one information-recording disc which has a central aperture having a first diameter, a first information-free region surrounding said central aperture which has a second larger diameter and a second outer region in which information is stored, said container comprising
   a) a bottom portion forming a first half of said container, said bottom portion having a substantially raised central pedestal for engaging and supporting a portion of a said information-recording disc which is generally limited to a said first information-free region, a post for extending through a said central aperture and including
      i) securing means for engaging at least a portion of an internal peripheral region of a said central aperture and retaining a said first information-free region in contact with said central pedestal, said securing means including at least two resilient fingers, each of said fingers having a disc-engaging portion and a rear portion remote from said disc-engaging portion,
      ii) manually operable release means permitting said securing means to be withdrawn from its engaging position and a said information-recording disc to be removed from said post and pedestal, wherein said manually-operable-release means includes a push-button member which, in a first extended position, physically engages said rear portion of each of said at least two resilient fingers to bias them outwardly into engagement with said internal peripheral region of said central aperture of a said information-recording disc and, in a second depressed position, physically disengages said rear portion of, each of said at least two resilient fingers permitting said fingers to be cammed inwardly and thereby disengaged from said peripheral region;
   b) a top portion forming a second half of said container which overlies said bottom portion in a closed position of said container.

2. The container of claim 1 wherein said at least two resilient fingers include four resilient fingers positioned generally at the corners of a quadrangle and each of said resilient fingers comprising a right angle segment.

3. The container of claim 2 wherein said push-button member comprises an equilateral cross interdigitated with said resilient fingers with one of said right angle segments positioned in each quadrant of said equilateral cross, adjacent arms of said equilateral cross, when said push-button member is in said first position, physically engaging a pair of orthogonal faces of one of said right angle segments biasing one of said resilient fingers outwardly.

4. The container of claim 1 wherein said top portion is attached to said bottom portion by a double living hinge portion.

5. The container of claim 4 further comprising stabilizing means provided in at least one of said bottom top and hinge portions to maintain said container in its proper alignment when said first and second halves are closed.

6. The container of claim 1 wherein both said bottom portion and said top portion are reinforced by a series of generally radially extending ridges.

7. The container of claim 1 further comprising an insertable platform for permitting a second information-recording disc to be at least partially enclosed between said bottom portion and said top portion.

8. The container of claim 1 further comprising a plurality of radially-extending stabilizing supports of short length and width positioned so as to underlie and engage a peripheral portion of a said information-recording disc and no information-containing portion of said disc.

9. The container of claim 8 further comprising a generally annular rib protruding upwardly from a floor region of said bottom portion, said generally annular rib being relieved at least one location so as to accomodate at least one finger of a user during insertion and removal of a said information-recording disc to and from said container.

10. The container of claim 9 wherein said upstanding supports extend radially inwardly from said annular rib.

11. The container of claim 1 further comprising means for latching said top and bottom portions in a closed position.

12. The container of claim 11 wherein said latching means comprises a first plurality of fingers extending downwardly from said top portion which engage a second plurality of fingers extending upwardly from said bottom portion.

13. A container for storing multiple information-recording discs, each of said discs having a central aperture with a first diameter, said central aperture having an inner peripheral portion, a first region surrounding said aperture that is information free having a second larger diameter and a second outer region in which information is stored, said container comprising
   a) a bottom portion which has a first platform with a first generally central, raised pedestal for engaging and supporting a portion of said information-recording disc which is generally limited to said first information-free region, a first post for extending through a said central aperture of a first said disc and including first securing means for retaining a said first information-free region in contact with said first central pedestal, said first securing means including at least two resilient fingers, each of said fingers having a disc-engaging portion and a rear portion remote from said disc-engaging portion, and a first manually-operable-release means permitting said securing means to be disengaged wherein said first manually-operable-release means includes a push-button member which, in a first extended position, physically engages said rear portion of each of said at least two resilient fingers to bias them outwardly into engagement with said internal peripheral portion of said central aperture of a said information-recording disc and, in a second depressed position, physically disengages said rear portion of each of said at least two resilient fingers permitting said fingers to be cammed inwardly and thereby disengaged from said peripheral portion;
   b) a second platform separate from the first having a substantially similar construction to said first platform including a second central pedestal, a second post for extending through a central aperture of a second said disc with a second information-recording means for retaining an information-free region of a said second disc in contact with said second central pedestal, and a second manually-operable-release means permitting said second securing means to be disengaged from a peripheral portion of said central aperture of a said second disc; and
   c) a top portion which overlies said bottom portion in a closed position of said container.

14. The container of claim 13 wherein said second platform is hingedly attached to said first platform.

15. Retaining means for securing an information recording disc having a central aperture, said retaining means to a pedestal including at least two resilient fingers, each of said fingers having a disc-engaging portion and a rear portion remote from said disc-engaging portion, and a manually-operable-release means permitting said retaining means to be disengaged from a secured disc wherein said manually-operable-release means includes a push-button member which, in a first extended position, physically engages said rear portion of each of said at least two resilient fingers to bias them outwardly into engagement with an internal peripheral portion of said central aperture of a said information-recording disc and, in a second depressed position, physically disengages said rear portion of each of said at least two resilient fingers permitting said fingers to be cammed inwardly and thereby disengaged from said peripheral portion.

* * * * *